June 28, 1966   B. J. DAVIES   3,258,583
MULTIPLYING DEVICE

Filed Aug. 31, 1962   2 Sheets-Sheet 2

INVENTOR
BEAUMONT J. DAVIES

BY
Holcombe, Wetherill & Brisebois
ATTORNEYS

… … …

United States Patent Office 3,258,583
Patented June 28, 1966

3,258,583
MULTIPLYING DEVICE
Beaumont John Davies, Putnoe, England, assignor to George Richards & Company Limited, Altrincham, England, a company of Great Britain
Filed Aug. 31, 1962, Ser. No. 220,795
14 Claims. (Cl. 235—151.11)

This invention relates to multiplying devices and the expression is used to mean devices which can select a predetermined proportion of pulses from a series of pulses, the predetermined proportion being the set multiplying factor.

Such multiplying devices may be used in many kinds of computer and one example is a computer used for determining the movements to be effected by a machine tool in order to machine a desired shape.

Multiplying devices are known in which the multiplying factor is available in a binary code, but one object of the present invention is to provide a multiplying device which is convenient for use where a multiplying factor is available only in some other code, for example, a decimal code.

According to the present invention, a multiplying device includes a multi on/off stage settable multiplying factor register arranged to count in a code of radix $n$ and a multiple binary counter having the same number of stages as the register and adapted to count in a code of the radix $n$ and to form pulses in response to transitions of stages from one stable condition to the other, in which each stage of the register has the same place significance as the number of pulse-forming transitions from a different one of the stages of the multiple binary counter in a cycle of input pulses, and in which the register stages control the passage of the transition-formed pulses or pulses controlled by them to an output or not according to whether the register stage concerned is set at unity or zero.

A multiplying factor may be set on the register by appropriate setting of the various on/off stages in accordance with a predetermined code. The register may then be considered to be a multiplier. For example, the factor can be set-up by feeding into the register or multiplier an appropriate number of pulses, or by setting individual stages to zero or unity.

The multiple binary counter may be arranged to count in a radix $n$, that is to complete a counting cycle after $n$ input pulses by appropriate interconnection of the various counter stages. For example, it may be arranged to repeat its counting cycle after every ten input pulses if it has four binary stages and feedback between stages is arranged to exclude six of the possible combinations of on/off conditions of the four stages. Each stage may be arranged to form a pulse whenever the stage condition changes from zero to unity, and this condition may be termed a pulse-forming transition. It follows that for a cycle of ten input pulses the counter should produce nine pulse-forming transitions, some from each of the stages of the multiple binary counter. A counter with its stages interconnected in this way will be said in this specification to be adapted to count in a binary-coded decimal or other non-binary code.

The place significance of the stages of the settable multiplier can be understood from the following example. If a four stage on/off settable multiplier is arranged in a 5121 code, it means that if the last stage is set at unity this represents a value of 5, if the third stage is set at unity this represents a value of 1, and so on, and it will be seen that any number from 0 to 9 can be set-up on the multiplier by making appropriate ones of the four stages unity and the others zero. The value indicated by each stage when it is set to unity is termed the place significance of that stage. It is a necessary condition that the place significance of the various stages of the settable multiplier shall each be the same as the number of pulse-forming transitions produced from a different one of the stages of the multiple binary counter during one cycle of input pulses. The counter can be considered to be a pulse distributor.

The multiplying device can readily be adapted for use with any number of digits. For example, a three digit multiplying factor can be set-up on a settable multiplier having a number of on/off stages for each digit and the multiple binary counter may have three counting units, later units receiving input pulses when the earlier units complete their counting cycles. It must be arranged that the stages of the settable multiplier on which the more significant figures of the multiplying factor are set should control the earlier digit stages of the pulse distributor.

A pulse distributor digit unit may be arranged to count in a 5121 code, in which the presence of unity on the last stage indicates 5, or the third stage indicates 1 and so on. This can be done by a unit in which the first pulse changes the first stage from zero to unity, the second input pulse changes the second stage from zero to unity and the first stage from unity to zero and the third input pulse changes the first stage from zero to unity leaving the second stage at unity, and the fourth pulse changes the third stage from zero to unity while feedback acts to retain the first and second stages at unity. The fifth input pulse changes the fourth stages from zero to unity while the first three stages are returned to zero. For the next five pulses the cycle repeats for the first three stages. On the tenth pulse the fourth stage is returned to zero. Thus examination will show that the stages produce the following pulse-forming transitions from zero to unity in a cycle of ten input pulses, namely four, two, two and one. If the multiplier used with such a pulse distributor has the multiplying factor set-up in a code using the place significances 4, 2, 2 and 1, in any order this multiplier can be used to control the supply of transition-formed pulses to the output. Thus, the multiplier may use a 2421 code.

Other combinations are a pulse distributor counting in a 2421 code and a multiplier on which the multiplying factor is set according to a 5121 code; a pulse distributor counting in a 3321 code and a multiplier in which the multiplying factor is set according to a 4311 code; a pulse distributor counting in a 4311 code and a multiplier on which the multiplying factor is set according to a 3321 code; and a pulse distributor counting in a 5421 code and a multiplier on which the multiplying factor is set in accordance with a 2421 code, because in each case the number of pulse-forming transitions produced from the various stages of the pulse distributor correspond with the place significances of the various stages of the multiplier.

It should be noted that counters counting in a code of a radix $n$ in which the $(n-1)$'s complement can be obtained by inversion, count backwards on their inverted outputs. Examples of this are the normal binary code and the 1233, 1242, 1251 and 1341 binary coded decimal codes.

In one form of the invention there is a gate unit for each stage of the counter or pulse distributor which is opened or closed according as the corresponding stage of the multiplier is set at zero or unity. A single pulse distributor may be used with more than one multiplier if each stage of the pulse distributor is associated with a composite gate having different passages which can be opened or closed in dependence upon the setting of the corresponding stages of the various multipliers. Of course, each gate will control the passage to a number of different outputs, one for each multiplier.

A pair of multipliers of the kind defined can be used to generate a straight line, if one multiplying factor is set to be the sine of the angle of the desired line to a fixed reference direction and the other multiplying factor is set to be the co-sine of this angle, and if the output pulses are used to determine the co-ordinates of points on the line. Thus, one set of output pulses may be used to determine X co-ordinates of the line and the other output pulses may be used to control Y co-ordinates of the line. The control may be applied to a marker or a cutter of a machine tool for example.

It is also possible to generate a circle by arranging that the output pulses for one co-ordinate control system continually reset the multiplying factor for the multiplier of the other co-ordinate control system and vice versa.

If only one multiplier is continually reset in this way a parabola will be generated and if both counters are reset in the same sense instead of one positively and one negatively a rectangular hyperbola will be generated. If only a constant fraction of the pulses from one counter are used to reset the other counter, an ellipse will be generated.

A predetermined rate of generation of the line can be ensured by controlling the rate of supply of the input pulses, for example, there may be an automatic arrangement for gradually increasing the pulse rate at the beginning of the line and decreasing the pulse rate at the end to accelerate and decelerate the marker or cutter.

A target counter may be originally set in accordance with a co-ordinate of the end of a line and may be counted backwards by the output pulses, so that when the target counter is counted to zero a signal can be given that the end of the line has been reached.

The invention includes a method of control of a machine tool element to follow a predetermined path defined using a multiplying device as defined above.

In the accompanying drawings.

Figure 1:
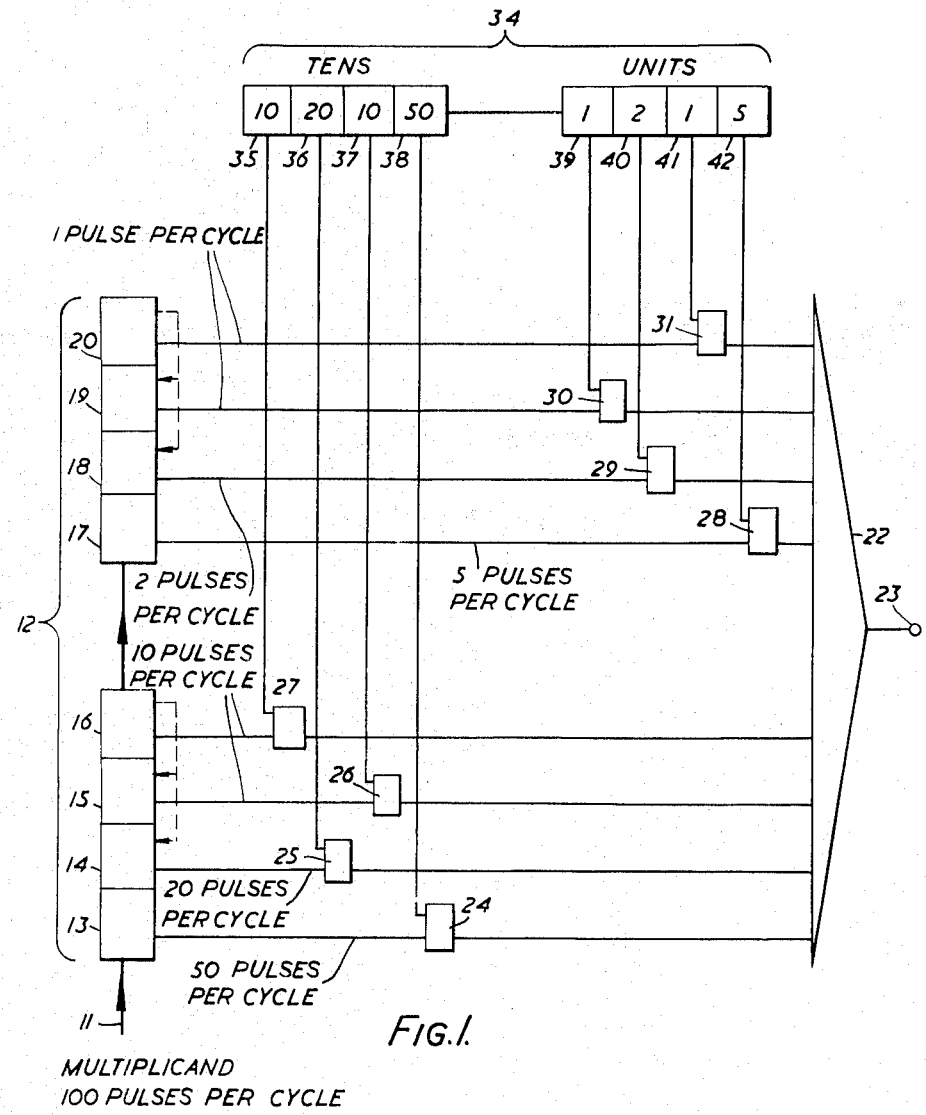
FIGURE 1 is a diagrammatic representation of the multiplying device.

A multiplication operation will be described by way of example using a multiplying device in which the invention is applied to a two digit multiplier.

Input pulses constituting the multiplicand are supplied to the input 11 to a two digit binary-coded decimal code pulse distributor 12 and each stage 13–29 of each digit of the distributor is arranged to produce pulses whenever the condition of that stage changes from zero to unity.

These pulses pass through an OR gate 22 to an output 23 or not according to the setting of a number of AND gates 24–31, one for each distributor stage, which AND gates are individually controlled, each by the setting of one stage of a suitable multiplier 34. The multiplier comprises for each digit a number of on/off or bi-stable units 35–42, the units for each digit being capable of being set to represent any selected decimal number in accordance with a selected code.

For each digit of the pulse distributor 12, there are four bi-stable units or stages such as 13–16 in series, the first 13 of which is changed from one state to the other whenever an input pulse is received at 11, the second 14 of which is changed from one state to the other whenever the first stage changes from unit to zero, the third stage 15 of which is changed from zero to unity whenever the second stage is changed from unity to zero, and so on. In the normal way such a four stage distributor would have sixteen different combinations of settings and in order to adapt the distributor to a decimal system, six of these combinations must be excluded. One way of doing this is to arrange feedback paths from later stages to earlier stages so that when a certain later stage is set to unity one or more earlier stages are also set to unity. For example, it may be arranged that when the fourth (last) stage 16 is set to unity both the second and third stages 14 and 15 are also set to unity, and in this way six of the possible combinations of settings are excluded and what would have been the combinations of the fourteenth and fifteenth input pulses namely 1110 and 1111 are now achieved when the eighth and ninth pulses arrive. This particular pulse distributor counts in the 2421 code. It may alternatively be arranged that when a certain later stage is set to zero one or more of the earlier stages are set to unity.

A pulse distributor adapted in a manner similar to this is called in this specification a binary-coded decimal code pulse distributor.

It is a characteristic of feedback type binary coded decimal counters, that the feedback produces very short unwanted transitions from zero to unity, and in order to prevent these from producing output pulses at the gates 24–31, slight integration of the pulse distributor output wave forms may be provided before they are fed to the gates.

Examination will show that with the pulse distributor described above the first stage produces five pulse-forming transitions in each cycle of ten input pulses, the second stage produces two and the third and fourth stages produce one pulse-forming transition each.

It is clear that the total number of pulses so produced by the four stages is nine.

The four stage pulse distributor for the next digit is the same as the pulse distributor just described but it only receives an input pulse when the fourth stage 16 of the first digit pulse distributor changes from unity to zero, that is to say for every tenth pulse applied to the input 11 of the first digit distributor.

If one hundred pulses are applied to the input 11 the first digit distributor will produce ninety transition-formed pulses—nine from each ten input pulses—and the second digit distributor will produce nine transition-formed pulses, and it is possible for any number of these ninety-nine pulses to be passed through the OR gate 22 to the output 23 in dependence on the setting of the various AND gates 24–31 controlled by the settable multiplier 34.

It is necessary that the code in which the decimal digits are set up on the settable multiplier 34 shall have phase significances corresponding to the numbers of transition-formed pulses from the various stages for each digit of the pulse distributor 12. It will be remembered that the four stages of the pulse distributor for each digit of the multiplicand produced respectively 5, 2, 1 and 1 transition-formed pulses for each ten cycles applied to them. Accordingly the settable multiplier 34 must have a code in which the phase significances are 5, 2, 1 and 1.

In the embodiment being described each digit of the multiplying factor is set up on one four stage binary register according to a 5, 1, 2, 1 code. This means that if the fourth or last stage 38 or 42 is set at unity rather than zero it represents the numeral 5, if the third stage 37 or 41 is set at unity rather than zero it represents the numeral 1 and so on, so that any digit from 0–9 could be set up by appropriate setting of the four stages of the multiplier register. Similarly the second digit of the multiplying factor is set up on a similar four stage counter.

The four AND gates 24–27 connected between the first digit pulse distributor stages 13–16 and the OR gate 22 are controlled by the four stages 35–38 of the multiplying factor register representing the most significant digit of the multiplying factor and the four AND gates 28–31 between the second digit pulse distributor stages 17–20 and the OR gate are controlled by the four stages 39–42 of the multiplying factor register representing the least significant digit.

The fourth stages 38 and 42 of the multiplying factor registers—which represent the numeral 5—control the first stages 13 and 17 of the pulse distributors which have fifty or five transition-formed pulses per cycle. The third and fourth stages 37 and 41, 35 and 39 of the multiplying factor registers—which represent the numeral 1—control the third or fourth stages of the pulse distributors which have one pulse per cycle, and the second multiplying factor register stages 36 and 40—which represent the numeral 2—control the second pulse distributor stages 14 and 18 which have twenty or two pulses per cycle.

It follows that if the fourth stage 38 of the multiplying factor register for the most significant digit is set to unity 50 transition-formed pulses from the first stage of the first digit pulse distributor will be passed to the output 23 and so on, and examination will show that whatever number from 0–99 is set up on the multiplying factor registers, that number of transition-formed pulses from the pulse distributors will pass to the output of the device from 100 input pulses to the pulse distributor.

Whatever their number, the pulses passed to the output will be substantially evenly spaced in time in the cycle.

In other words there has been provided a fractional multiplier whereby a two-digit decimal multiplying factor can be set on a counter 34 and a corresponding number of pulses per hundred from an input source of pulses 11 can be passed to an output 23.

AND gates

Figure 2:
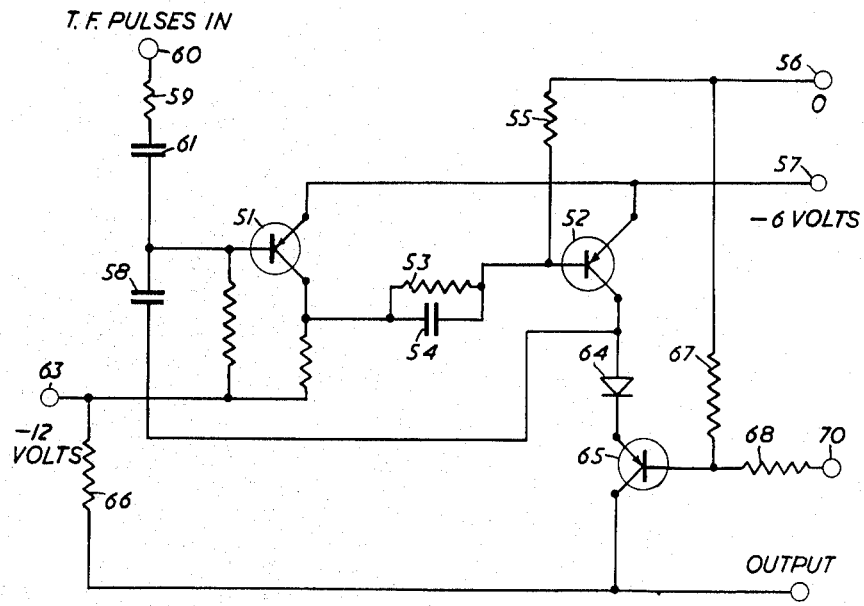
FIGURE 2 is a circuit diagram of a gate used in the multiplying device of FIGURE 1.
Figure 3:
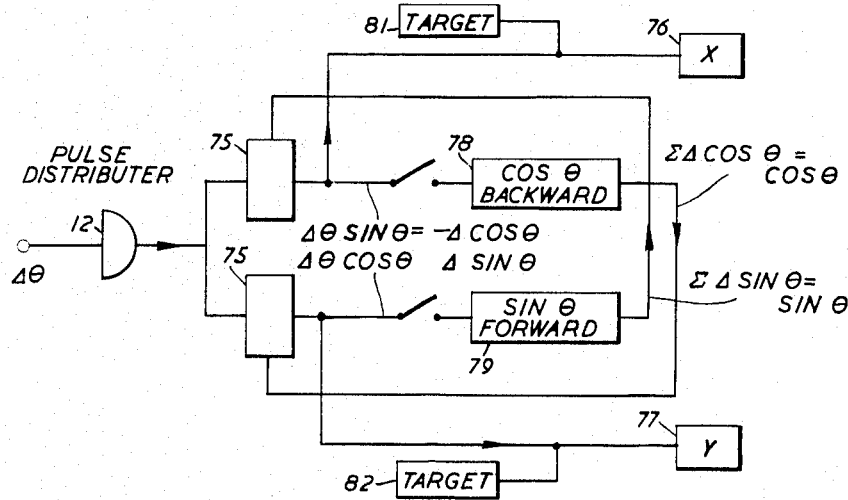
FIGURE 3 is a diagram of a system using two multiplying devices for controlling the machine tool element.

A gate arrangement for controlling the supply of transition-formed pulses from a pulse distributor stage to the output in dependence on the setting of a stage of the multiplier 34 may be in the form shown in FIGURE 2.

Two transistors 51 and 52 are connected as a conventional mono-stable circuit with the collector of the input transistor 51 connected through a resistor 53 and condenser 54 in parallel to the base of the output transistor 52 which is also connected through a resistor 55 to zero voltage bias 56. The two emitters are connected to a six volts negative supply 57. The resistive collector load of transistor 51 is connected to the 12 volts negative supply. The collector of the output transistor 52 is connected to the base of the input transistor 51 by way of a condenser 58 and to a load described more fully below.

Transition-formed pulses from a stage of the pulse distributor 12 are connected through a resistor 59 and a condenser 61 in series to the base of the input transistor 51 which is also connected through a resistor 62 to a twelve volts negative supply 63.

In the stable condition the input transistor 51 is conducting and the output transistor 52 is cut-off, but when a positive transistor-formed pulse appears at the input 60 these conditions are reversed and the input transistor 51 is cut-off for a time interval determined in the usual way for monostable circuits. The time interval may for example be set to 5 microseconds.

The collector of the output transistor 52 is connected through a rectifier 64 to the emitter of a gating transistor 65 whose collector is connected to the twelve volts negative supply 63 through a 1.5K output resistor 66. The base of the gating transistor 65 which is biased through a resistor 67 by the zero voltage 56, is connected at 70 through a further resistor 68 to the twelve volts negative supply or to zero according as the setting of the corresponding stage of the settable multiplier counter 34 requires transition-formed pulses to pass to the output or not.

If the base of the gating transistor 65 is set at twelve volts negative when the output transistor 62 of the monostable circuit becomes conducting a positive pulse appears across the output resistor 66. In this way appropriate setting of the potential of the base of the gating transistor 65 in dependence upon the multiplier setting determines whether transistion-formed pulses from a particular stage of the pulse distributor are passed to the output or not. Pulses from each digit (four stages) of the pulse distributor 12 are fed to a common load.

There will be a corresponding circuit for each stage of the pulse distributor for each digit with a gating transistor controlled by a different counter stage of the settable multiplier. If several multiplying operations are to be performed, it is possible to use a common pulse distributor and to use the mono-stable circuit 51–52 for a gating operation for each multiplication and there may be a number of gating transistors each in series with a rectifier connected in parallel with the gating transistor already described. Each additional gating transistor will then have an output resistor connected between its collector and the twelve volts negative supply and will have its base connected to the corresponding stage of different settable multiplier.

As the transition-formed pulses appear at the output of the output transistor 52, pulses will also appear across any output resistor whose gating transistor base is biassed twelve volts negative but not across any other output resistor.

If none of the bases of the gating transistors is negative when the output transistor 52 becomes conducting the mono-stable circuit does not operate because of the high collector load but this will not matter because under these conditions no pulses are required at any output.

It should be observed that one gating transistor from each mono-stable circuit, which gating transistor is controlled by a different stage of a common settable multiplier 34, is connected across a single output resistor which will in consequencee receive pulses corresponding to all the transition-formed pulses in a pulse distributor which are required by the particular setting of the multiplier. When many digits each consisting of 4 stages, are required it is convenient to produce pulses corresponding to each digit across separate loads, and to sum these pulses together in an OR gate.

Straight line generation

An application of the multiplier in which it forms part of equipment for generating a straight line will now be described.

The transition-formed pulses from a common pulse distributor 12 are connected in parallel to the AND gates of two multiplying devices 75, which share the pulse distributor and whose two outputs are connected to supply pulses each to one of two co-ordinate control systems 76 and 77. Each of these control systems may be of the kind described in U.S. patent application Serial No. 47,544 in which a command signal is provided by modulation of a square wave by the addition of modulating pulses.

If the slope of the straight line is to be say 31/60, that is to say movement in one co-ordinate is to be $^{31}/_{60}$ of the movement in the other co-ordinate, then the multiplying factor for one multiplier device 75 is set on its settable register at .31 and the multiplying factor for the other multiplier device is set at .60 and it is clear that out of one hundred pulses entering the pulse distributor, in consequence of the multiplication thirty-one will be fed to the control system 76 for one co-ordinate and sixty will be fed to the control system 77 for the other co-ordinate so that the desired straight line will be generated. It will never have an error more than the movement corresponding to one pulse in either co-ordinate control system.

Circle generation

This arrangement can be fairly simply adapted for the generation of a circle or circular arcs.

It can be shown that in order to generate a circular arc the same method can be employed as for generating a straight line provided that the multiplying factors are continually reset as the line is generated to change the slope of the line.

The slope of the straight line, which was 31/60 in the example described above, can be considered to be sin $\theta$/cos $\theta$ where $\theta$ is the angle between the straight line and the X coordinate. It follows that the two multiplying factors .31 and .60 represent sin θ and cos θ respectively and, of course, in a straight line these remain constant.

In generating a circle the slope is continually changing and it is only necessary to arrange that the output from each of the AND gates of the multiplying device 75 for the two co-ordinate control systems is also supplied to reset a counter 78 or 79 controlling the multiplying factor register for the other co-ordinate control system to reset the multiplying factor continuously as the line is generated.

If each pulse supplied to the pulse distributor 12 produces a change in slope of the curve generated of Δθ, which, in the case of a circle, is the change in the angle subtended at the centre of the circle, the two products from the multipliers will be respectively Δθ sin θ and Δθ cos θ which can readily be shown to be equal to −Δ cos θ and Δ sin θ respectively, and these represent the necessary changes in the set multiplying factors for generating a circle.

These changes can be made by making one of the counters 79 count upwards while the other 78 counts downwards in accordance with the negative sign.

It may be noted that if circular arcs are generated which do not pass through points where sin θ or cos θ equals nothing, then the counters 78 and 79 have only to count one way throughout the operation.

The X and Y co-ordinates of the start of the line with respect to the finish of a straight line or the start of a circle with respect to the centre are fed into the counters 78 and 79 and a series of pulses is fed into the pulse distributor to generate the desired line.

For a constant pulse rate into the pulse distributor 12 in a straight line or circle generator, the linear or circumferential feed rate will be proportional to the length of the straight line or the radius of the circle. This characteristic can be modified to be a constant linear or circumferential velocity characteristic by switching the input pulse train to the pulse distributor to the input of the appropriate stage of the pulse distributor, and by varying the input pulse rate over the range 10 to 1 inversely as the number obtained by ignoring the more significant non-zero digits in the line length or circle radius. This may be done by digital or analogue means.

For example if the pulse distributors are 6 decades long the radius or length is 02.0000 inch the incoming pulses are fed to the second stage of the pulse distributor. The number of 0's before the most significant non-zero digit controls this switching.

In general the feed rate can be adjusted by factors other than multiples or sub-multiples of 10 by adjusting the value of the capacitance in an RC network of a time-base type oscillator pulse generator.

Other feed rate control such as acceleration and deceleration at the beginning and the end of a machining movement can be controlled by varying the resistance R.

It is also convenient to arrange that the pulse outputs to the two co-ordinate control systems 76, 77 are fed into respective backward counting target counters 81 and 82 which are originally pre-set in accordance with the desired co-ordinate difference between the end and the start of the line or circle to be generated. As the line or circle is generated the target counters count backwards and should both reach zero simultaneously when the target is reached. The counter which is calculated to be changing most rapidly as the target is approached (the "fast" counter) can be used to initiate the deceleration referred to above.

After each operation both target counters should be counted to zero before commencing another operation to avoid cumulative error. This may be done by disconnecting the pulse line to the appropriate co-ordinate control system and the target counter when the appropriate target counter reaches zero. If it is the "slow" target counter which has reached zero first the pulses going into the "fast" counter and the output line continue until the fast counter is counted to zero, but if it is the "fast" counter which has reached zero first, the pulses normally feeding the "slow" counter are stopped and the pulses normally feeding the "fast" counter are fed into it until the "slow" counter reaches zero. This must be done because otherwise during circle generation when the "slow" counter reaches zero the pulse rate into the "slow" counter would be zero and there would be no pulses available for correction of the error.

A similar computer to that used for straight line or circle generation can be used for cutter radius compensation calculations. This computer can be fed from the same pulse distributor as the straight line or circle generator.

The cutter radius compensation settable multiplying registers can be set up from a bank of switches on which is set the sign and magnitude of the difference between the actual cutter radius and the programmed cutter radius. The diminishing cutter radius compensation register is set to this difference when a circular arc programme step departs from a cardinal point with respect to the machine tool axes. Every time a circular arc programme stop reaches a cardinal point the same error correction method as used in straight line/circle generation is used.

The pulse train produced by this cutter radius compensation computation is added to or subtracted from the straight line/circle pulse trains according as the cutter is over or under size, and according as an inside or outside circle is being cut. No cutter radius compensation pulses are added or subtracted for straight lines.

Alternatively the cutter radius compensation pulse trains can be fed to phase converters, for example those described in United States patent application Serial No. 47,544.

The outuput of these phase converters can be used on the shop floor to modify the position command signal to obtain variable cutter radius compensation. Alternatively the X CRC pulses are synchronised to pulses from the pulse synchroniser in the main X pulse to phase converter; the remainder of the X CRC pulse to phase converter being unaltered. If the output of the X pulse to phase converter and the X CRC pulse to phase converter are then fed into the 2 inputs of a flip-flop, the mark space ratio of the X signal will vary according to the direction of the CRC vector w.r.t. the X axis. This variable mark space ratio can be used on the shop floor to modify the position command signal according to the amount of CRC required.

What I claim as my invention and desire to secure by Letters Patent is:

1. A pair of multiplying devices, each including a settable multiplying factor register having $x$ on/off stages, with $x$ being an integer, and arranged to be set in a code of radix $n$ where $n$ is more than 2 and less than $2^x$ and a multiple binary counter having $x$ bistable stages and feedback connections between stages for causing said counter to count in a code of the radix $n$, and means for supplying input pulses to the counter, means for forming pulses in response to transitions of counter stages from one stable condition to the other, in which the value set on each stage of the register when set to its on position is equal to the number of pulse-forming transitions made by a corresponding one of the stages of the multiple binary counter while said counter passes through one complete counting cycle, each counter stage being connected to an output through an individual gate, and the gate for each counter stage being connected to be opened and closed in accordance with the position of the corresponding register stage, so that the position of said register stages determines those gates through which the transition formed pulses may pass to an output, said multiplying devices being associated with a cutter and a control for said cutter, said control including means for controlling movement of the cutter parallel with one axis, in response to the output pulses from one device, means for controlling movement of the cutter parallel with a perpendicular axis in response to the output pulses from the other device, and means responsive to the output pulses from said one device for continually resetting the multiplying factor of the other multiplying device.

2. A multiplying device as claimed in claim 1 in which the multiplying factor register is set to count in a 2421 code.

3. A multiplying device as claimed in claim 1 in which the counter is adapted to count in a binary-coded decimal code.

4. A control as claimed in claim 1 including means responsive to the output pulses from the other device for continually resetting the multiplying factor of the one multiplying device.

5. A control as claimed in claim 4 in which both multiplying factors are reset in the same sense.

6. A control as claimed in claim 4 in which the multiplying factors are reset in different senses.

7. A control as claimed in claim 4 including means for using only a constant fraction of the pulses from one device for resetting multiplying factor of the device.

8. A control as claimed in claim 1 including means for controlling the rate of supply of input pulses to the devices.

9. A control as claimed in claim 8 including means for automatically gradually increasing the pulse rate at the beginning of an operation and decreasing the pulse rate at the end.

10. A control as claimed in claim 1 including means for automatically maintaining the magnitude of the vector sum of the movements corresponding to the two pulse trains substantially constant, independent of the magnitude of the numbers set in the multiplying factor registers.

11. A control as claimed in claim 1 including a settable target counter which is arranged to be counted backwards by one set of output pulses.

12. A control system as claimed in claim 11 including means for indicating when the target counter has been counted to zero.

13. A control system as claimed in claim 12 including means for controlling the two movements simultaneously from the target counter.

14. A multiplying device as claimed in claim 1 with its multiplying factor set to be a sine of an angle and a second similar multiplying device with its multiplying factor set to be the co-sine of this angle and means for supplying the same input pulses to the two multiplying devices.

References Cited by the Examiner
UNITED STATES PATENTS

| | | | |
|---|---|---|---|
| 2,538,122 | 1/1951 | Potter | 235—92 |
| 2,910,237 | 10/1959 | Meyer et al. | 235—164 |
| 2,927,735 | 3/1960 | Scuitto | 235—151 X |
| 2,954,167 | 9/1960 | Williams | 235—160 |
| 2,961,160 | 11/1960 | Bell et al. | 235—160 |
| 2,997,234 | 8/1961 | Hughes | 235—160 |
| 3,004,166 | 10/1961 | Greene. | |
| 3,021,066 | 2/1962 | Martens | 235—160 |
| 3,035,216 | 5/1962 | Rhodes et al. | |
| 3,057,554 | 10/1962 | Allen et al. | 235—160 |
| 3,079,522 | 2/1963 | McGarrell | 235—151.11 |
| 3,081,031 | 3/1963 | Livesay | 235—160 |
| 3,084,285 | 4/1963 | Bell et al. | 235—160 X |
| 3,158,736 | 11/1964 | Toth | 235—164 |
| 3,177,350 | 4/1965 | Abbott et al. | 235—152 |

MALCOLM A. MORRISON, *Primary Examiner.*

K. W. DOBYNS, *Assistant Examiner.*